Figure 1:
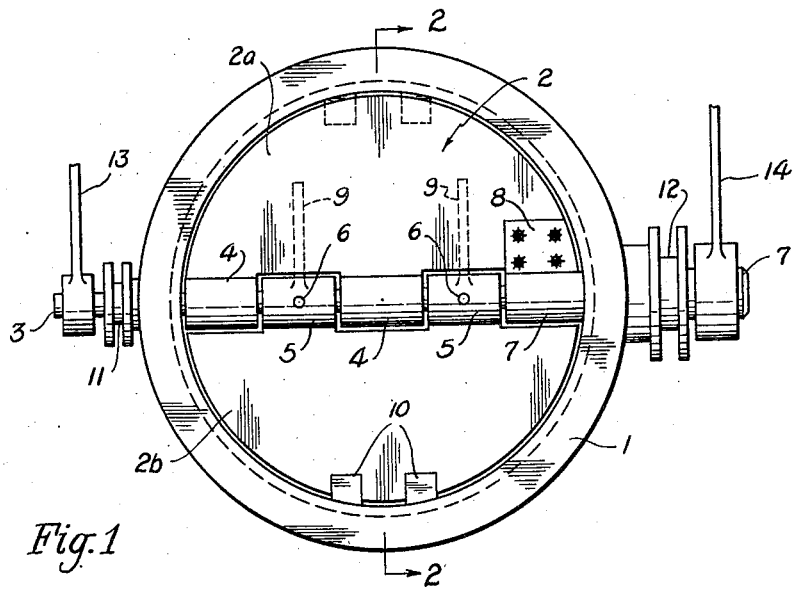

Dec. 25, 1962 L. KNECHT 3,070,345
PIPE LINE VALVE
Filed Aug. 11, 1961 2 Sheets-Sheet 1

INVENTOR
Ludwig Knecht

BY
ATTORNEYS

Dec. 25, 1962  L. KNECHT  3,070,345
PIPE LINE VALVE

Filed Aug. 11, 1961  2 Sheets-Sheet 2

INVENTOR
Ludwig Knecht

BY Bailey, Stephens & Huettig
ATTORNEYS

United States Patent Office 3,070,345
Patented Dec. 25, 1962

3,070,345
PIPE LINE VALVE
Ludwig Knecht, Wiesbaden, Germany, assignor to Maschinenfabrik Augsburg-Nurnberg A.G., Nurnberg, Germany
Filed Aug. 11, 1961, Ser. No. 130,941
2 Claims. (Cl. 251—212)

This invention relates to a valve and, in particular, to a valve for a pipe line.

Along with dampers, butterfly valves and check valves of conventional construction are commonly used as shut-off devices in pipe lines. Some kinds of construction require that two types of valves be used at the same time. For example, a shunt connection for a gas tank needs two types of valves when the gas is filled into and taken from the tank by means of a single pipe line. In this case, the tank should be automatically sealed closed before the gas fills the maximum volume of the tank in order to prevent the tank from being overloaded. On the other hand, the tank should be automatically closed off before being completely emptied in order to avoid a sub-atmospheric pressure in the tank. However, it must be ensured that the tank can either be filled with gas or discharged of gas. Such requirement can be accomplished by two oppositely directed check valves which are by suitable means remotely controlled from the tank.

In many cases, a throttle valve is used as a quick closing device for gas tanks, such valve permitting the shutting off of the tank from the pipe system at all times and independent of other closure devices. Such a throttle valve is used in addition to the aforesaid described check valves and means that it is necessary to use three valves altogether.

The object of this invention is to combine the two check valves with the throttle valve into one closure means in order to save considerable material and manufacturing costs.

In general, the object of the invention is obtained by making a valve for pipe lines such as used for gas tanks composed of two wings rotatably mounted on a common shaft in a housing with one wing having a stop member for preventing the movement of the second wing in one direction. Preferably the housing is provided with abutments mounted on the inner wall of the housing in the plane perpendicular to the wall and passing through the axis of the shaft supporting the two wings so that, when the wings are in closed position, they rest against the abutments in opposite directions. When the valve is to be used as a throttle valve, the two wings are joined together for rotation as a unit.

The valve of this invention is not only usable for a gas tank, but can also be used for any kind of liquid or gas. The valve can be installed in a horizontal, vertical, or diagonal position.

Figure 2:
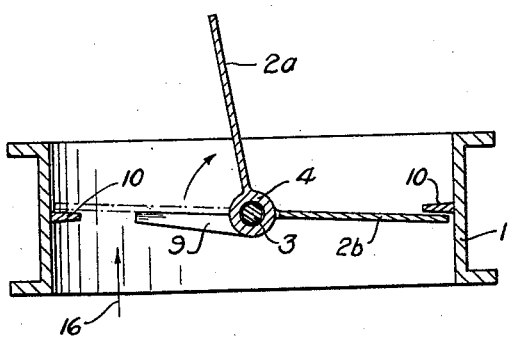
Figure 3:
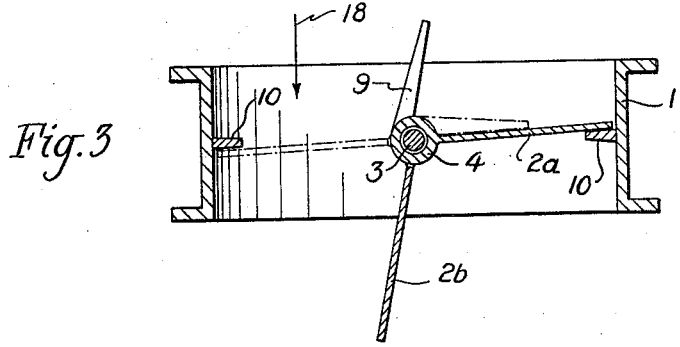
Figure 4:
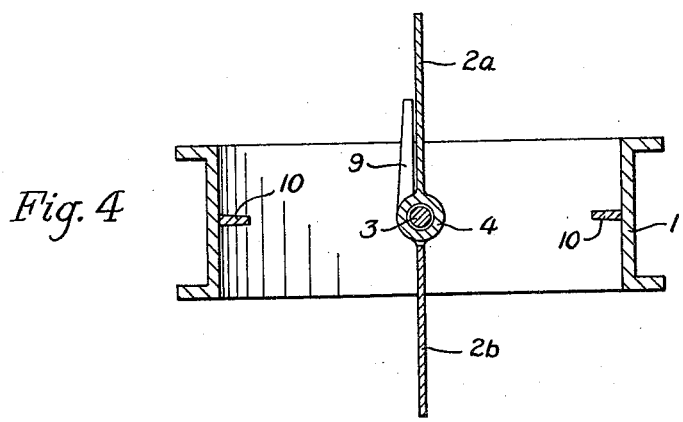
Figure 5:
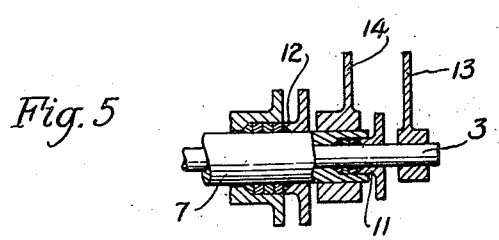

The means by which the objects of the invention are obtained are described more fully with reference to the accompanying schematic drawings, in which:

FIGURE 1 is a plan view of a closed valve;
FIGURE 2 is a cross-sectional view taken on the line 2—2 of FIGURE 1 but showing one valve wing in open position;
FIGURE 3 is a cross-sectional view similar to FIGURE 2 but with the valve housing turned 180° and having the other valve wing open;
FIGURE 4 is a cross-sectional view similar to FIGURE 2 but showing the two valve wings joined for rotation as a unit; and
FIGURE 5 is an enlarged detail view of a modification of FIGURE 1.

To facilitate the installation of the valve in a pipe line, the housing 1 is provided for insertion into the pipe line. The valve 2 as shown in FIGURES 1 to 4 is composed of two wings 2a and 2b, respectively, each of which is mounted on the common shaft 3 for independent rotation or for rotation as a unit. Shaft 3 extends transversely through housing 1 and across the direction of gas flow, this shaft projecting outwardly of both sides of housing 1. Wing 2a is rotatably mounted on shaft 3 by means of hinges 4. Wing 2b is held on shaft 3 by means of cylindrical members 5 slipped over shaft 3 and secured thereto by pins 6. In order to rotate wing 2a on the shaft, a sleeve 7 is telescoped over one end of the shaft 3 and is secured to wing 2a by means of a strap 8. Thus sleeve 7 functions both as a hinge and an actuating means for wing 2a. Wing 2b has one or more stop members 9 secured to cylindrical members 5 against which stop members the other wing 2a can bear or rest.

On the inner wall of housing 1 and lying in the plane perpendicular to the wall and passing through the axis of shaft 3 are abutments 10 against which wings 2a and 2b bear, respectively, in opposite directions. Thus each wing can be turned only through an arc of 180°.

In order to rotate wings 2a and 2b as shown in FIGURE 1, shaft 3 projects beyond the outer walls of housing 1 through stuffing boxes 11 and 12, respectively. On the left side of FIGURE 1, handle 13 is fixed to shaft 3 so that this handle is used to turn wing 2b. On the other side of the housing 1, handle 14 is secured to sleeve 7 so that this handle is used to rotate wing 2a. Counterweights can be provided for handles 13 and 14 in order to compensate for the weight of wings 2b and 2a, respectively. Also, the abutments 10 can be replaced by stops or abutments mounted outwardly of housing 1 and against which handles 13 and 14 can strike.

FIGURE 2 shows wing 2a in open position, thus opening one-half of the cross-sectional area of the pipe for the flow of gas in the direction of the arrow 16. In closed position, the wing 2a will lie against the abutment 10 as indicated by the dot-dash lines.

When the valve is to be opened for the flow of gas in the direction opposite that of arrow 16, the valve 2b is opened as shown in FIGURE 3, with the gas flowing in the direction of the arrow 18. In closed position, the wing 2b will lie against the abutment 10 as shown by the dot-dash lines in FIGURE 3. The valve when working as shown in FIGURES 2 and 3 functions as a check valve.

In FIGURE 4, the valve is used as a butterfly valve. As such, the wings 2a and 2b are joined to one another for rotation as a single unit. In closed position, the joined wings will block gas flow in each direction. The wings 2a and 2b can be effectively joined for rotation as a single unit by the simultaneous actuation of handles 13 and 14 as shown in FIGURE 1. However, other means for joining wings 2a and 2b together can be used as, for example, by means of a magnet. Again, handles 13 and 14 can be joined to one another for simultaneous movement. This is done as shown in FIGURE 5 by placing handle 13 on the same side of the housing as handle 14 so that the two handles can be coupled to one another.

Having now described the means by which the objects of the invention are obtained,

I claim:
1. A pipe line valve comprising a housing, a pair of valve wings mounted in said housing and rotatable around a common axis for opening and closing said valve, at least one stop member extending outwardly from the common axis edge of a first wing of the pair of wings for blocking the movement of the second wing in one direction of rotation, and abutments mounted on opposite sides of the inner wall of said housing in the plane perpendicular to said wall and passing through the axis of said shaft for limiting the movement of each of said wings in opposite directions and against which the wings bear in closed position on opposite faces of said abutments.

2. A pipe line valve as in claim 1, further comprising a shaft journaled in said housing and forming said common axis, said first wing being secured to said shaft and rotatable therewith, a sleeve rotatably telescoped upon one end of said shaft and secured to said second wing and forming a hinge for said second wing.

References Cited in the file of this patent

UNITED STATES PATENTS

| | | |
|---|---|---|
| 1,105,208 | Robinson | July 28, 1914 |
| 1,470,425 | Curtis | Oct. 9, 1923 |
| 1,872,213 | Anderson | Aug. 16, 1932 |
| 1,998,886 | Scheid | Apr. 23, 1935 |
| 2,412,918 | Sladky | Dec. 17, 1946 |
| 3,026,901 | Wheeler | Mar. 27, 1962 |